(12) United States Patent
Fossum et al.

(10) Patent No.: US 6,681,237 B1
(45) Date of Patent: Jan. 20, 2004

(54) EXPONENTIATION CIRCUIT FOR GRAPHICS ADAPTER

(75) Inventors: Gordon Clyde Fossum, Austin, TX (US); Thomas Winters Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 09/656,526

(22) Filed: Sep. 7, 2000

(51) Int. Cl.$^7$ .................................................. G06F 7/38

(52) U.S. Cl. ..................................................... 708/606

(58) Field of Search ............................... 708/606, 512, 708/277

(56) References Cited

U.S. PATENT DOCUMENTS

| | | | | |
|---|---|---|---|---|
| 5,912,830 A | * | 6/1999 | Krech, Jr. et al. ........... | 708/606 |
| 5,926,406 A | * | 7/1999 | Tucker et al. ................ | 708/606 |
| 6,381,625 B2 | * | 4/2002 | Oberman et al. ............ | 708/606 |
| 6,480,873 B1 | * | 11/2002 | Inoue et al. ................. | 708/606 |

* cited by examiner

Primary Examiner—Tan V. Mai
(74) Attorney, Agent, or Firm—Joseph P. Lally; Mark E. McBurney

(57) ABSTRACT

A floating point exponentiation circuit suitable for calculating the value $B^E$ is disclosed where B and E are floating point values. The floating point exponentiation circuit includes circuitry for producing a value P, where P is approximately equal to $E*((BEXP-127)+\log_2(1.BMAN))$, BEXP is an exponent field of the base B, and 1.BMAN is a 24-bit mantissa field of the base B. The floating point exponentiation circuit further includes circuitry for adjusting the value P wherein the floating point representation of the adjusted value of P includes a mantissa field that indicates an integer portion $P_i$ of P and a fractional portion $P_f$ of P. The floating point exponentiation circuit further includes circuitry for extracting $P_i$ from the floating point representation of the adjusted value of P and producing an exponent field for the floating point value $B^E$ and circuitry for extracting $P_f$ from the floating point representation of the adjusted value of P and producing a mantissa field for the floating point value $B^E$. The circuitry for producing P may include a first lookup table configured to retrieve a floating point representation of (BEXP-127) and a logarithm unit configured to generate an estimate of the $\log_2(1.BMAN)$. The logarithm unit may include a slope lookup table and a Y intercept table that together define a linear approximation to the curve $y=\log_2(x)$ at a point x defined by a portion of BMAN. The floating point exponentiation circuit may further include floating point comparator circuitry configured to compare the value P against upper and lower limits. The circuit may be configured to output an upper limit value if the value P exceeds the upper limit and a lower limit value if the value P exceeds the lower limit value. The floating point format of the adjusted value of P may have a common exponent field regardless of the value of P if P is greater than the lower limit and less than the upper limit. The circuitry for adjusting the value P may include a floating point adder configured to add a floating point constant to the value P.

26 Claims, 6 Drawing Sheets

EXPONENTIATION CIRCUIT FOR GRAPHICS ADAPTER

BACKGROUND

1. Field of the Present Invention

The present invention relates generally to computer graphics and more particularly to a circuit that efficiently determines a floating point exponentiation.

2. History of Related Art

Graphics display subsystems are almost universally employed in microprocessor based computer systems to facilitate a variety of graphics tasks and applications including computer-assisted drafting, architectural design, simulation trainers for aircraft and other vehicles, molecular modeling, virtual reality applications, and video games. Graphics processors, graphics adapters, and a variety of similarly designed computer products provide specialized hardware to speed the execution of graphics instructions and rendering of graphic images. These processors and adapters typically include, for example, circuitry optimized for translating, rotating, and scaling 3D graphic images.

In a typical application, a graphical image that is displayed on a display terminal or other output device is composed of one or more graphic primitives. For purposes of this disclosure, a graphic primitive may be thought of as one or more points, lines, or polygons that are associated with one another, such as by being connected to one another. Typically, the displayed image is generated by creating one or more graphic primitives, assigning various attributes to the graphic primitives, defining a viewing point and a viewing volume, determining which of the graphic primitives are within the defined viewing volume, and rendering those graphic primitives as they would appear from the viewing point. This process can require a tremendous amount of computing power to keep pace with the ever increasingly complex graphics applications that are commercially available. Accordingly, designers of graphics systems and graphics applications are continuously seeking cost effective means for improving the efficiency at which graphic images are rendered and displayed.

Typically a software application program generates a 3D graphics scene, and provides the scene, along with lighting attributes, to an application programming interface (API) such as the OpenGL® API developed by Silicon Graphics, Inc. Complete documentation of OpenGL® is available in M. Woo et al., *OpenGL Programming Guide: The Official Guide to Learning OpenGL, Version* 1.2 (Addison Wesley Longman, Inc. 1999) and D. Schreiner, *OpenGL Reference Manual, Third Edition: The Official Reference Document to OpenGL, Version* 1.2 (Addison Wesley Longman, Inc. 1999), both of which are incorporated by reference herein.

A 3D graphics scene typically includes of a number of polygons that are delimited by sets of vertices. The vertices are combined to form larger primitives, such as triangles or other polygons. The triangles (or polygons) are combined to form surfaces, and the surfaces are combined to form objects. Each vertex is associated with a set of attributes. Vertex attributes may include a position, including three Cartesian coordinates x, y, and z, a material color, which describes the color of the object to which the vertex belongs, and a normal vector, which describes the direction to which the surface is facing at the vertex. Each vertex may also be associated with texture coordinates and/or an alpha (transparency) value. In addition, the scene itself may be associated with a set of attributes including, as examples, an ambient color that typically describes the amount of ambient light and one or more individual light sources. Each light source has a number of properties associated with it, including a direction, an ambient color, a diffuse color, and a specular color.

Rendering is employed within the graphics system to create two-dimensional image projections of a 3D graphics scene for display on a monitor or other display device. Typically, rendering includes processing geometric primitives (e.g., points, lines, and polygons) by performing one or more of the following operations as needed: transformation, clipping, culling, lighting, fog calculation, and texture coordinate generation. Rendering further includes processing the primitives to determine component pixel values for the display device, a process often referred to specifically as rasterization.

The OpenGL® API specification and other API's such as the graPHIGS API define the allowed vertex and scene attributes and the equations used to determine attribute values. These equations typically include extensive use of floating point values and floating point calculations. Determining lighting attributes, for example, requires a sequence of floating point calculations including floating point exponentiation calculations of the form $Y=B^E$ in which the base B and exponent E are both floating point values. A floating point exponentiation calculation is notoriously slow (i.e., expensive) in a graphics adapters that relies primarily on software to perform the calculation. It is therefore desirable to implement a floating point exponentiation circuit that determines a floating point value quickly.

SUMMARY OF THE INVENTION

The problem identified above is achieved with a floating point exponentiation circuit suitable for calculating the value $B^E$ as disclosed herein where B and E are floating point values. The floating point exponentiation circuit includes circuitry for producing a value P, where P is approximately equal to $E*((BEXP-127)+\log_2(1.BMAN))$, BEXP is the exponent field of the base B, and 1.BMAN is the 24-bit mantissa field of the base B. The floating point exponentiation circuit further includes circuitry for adjusting the value P such that the mantissa field of the floating point representation of the adjusted value of P includes a portion $P_i$ (the integer portion) that indicates the integer portion of P and a portion $P_f$ (the fractional portion) that indicates the fractional portion of P. The floating point exponentiation circuit further includes circuitry for extracting $P_i$ from the floating point representation of the adjusted value of P and producing an exponent field for the floating point value $B^E$ and circuitry for extracting $P_f$ from the floating point representation of the adjusted value of P and producing a mantissa field for the floating point value $B^E$. The circuitry for producing P may include a first lookup table configured to retrieve a floating point representation of (BEXP−127) and a logarithm unit configured to generate an estimate of the $\log_2(1.BMAN)$. The logarithm unit may include a slope lookup table and a Y intercept table that together define a linear approximation to the curve $y=\log_2(x)$ at a point x defined by a portion of BMAN. The floating point exponentiation circuit may further include floating point comparator circuitry configured to compare the value P against upper and lower limits. The circuit may be configured to output an upper limit value if the value P exceeds the upper limit and a lower limit value if the value P exceeds the lower limit value. The floating point format of the adjusted value of P may have a common exponent field regardless of the value of P if P is greater than the lower limit and less than the upper limit. The circuitry for adjusting the value P may include a floating point adder configured to add a floating point constant to the value P. In one embodiment, the circuitry for extracting $P_i$ from the adjusted value of P includes a fixed point adder that adds a value of 127 to $P_i$ and stores the resulting sum into the exponent field portion of a floating point result register. The circuitry for extracting $P_f$ from P may include an exponential unit that estimates the value $2^{\wedge}P_f$. The exponential unit may include an estimation lookup table that returns a value of $2^{\wedge}N$ where N represents a first portion of $P_f$. The exponential circuit may further include a correction lookup table that returns a correction factor based on the value of N. The correction factor may be multiplied by the value $P_f$ to produce a correction factor that is added to the value retrieved from the estimation lookup table in a fixed point adder. The output of the fixed point adder is then stored in the mantissa portion of the result register.

BRIEF DESCRIPTION OF THE DRAWINGS

Other objects and advantages of the invention will become apparent upon reading the following detailed description and upon reference to the accompanying drawings in which.

Figure 1A:
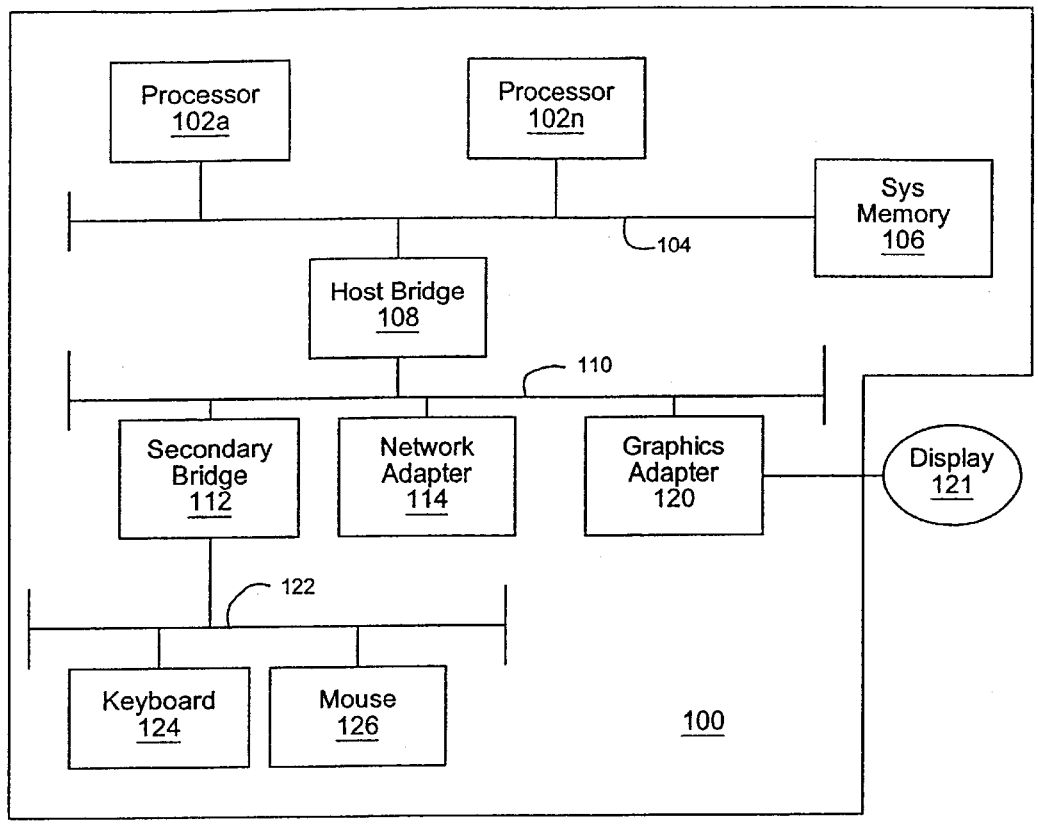
FIG. 1 is a block diagram of a data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram of data processing system 100 according to one embodiment of the present invention. In the depicted embodiment, system 100 includes one or more processor(s) 102a through 102n (generically or collectively referred to herein as processor(s) 102) are connected to a system bus 104. Processors 102 may be implemented with any of a variety of microprocessor components including, as examples, PowerPC® processors from IBM Corporation, SPARC® processors from Sun Microsystems, and x86 compatible architectures such as the Pentium® family of processors from Intel Corporation and the Athlon® family of processors from Advanced Micro Devices, Inc.

A system memory (RAM) 106 is accessible to processors 102 via system bus 104. A host bridge 108 is connected between system bus 104 and an IO bus 110. IO bus 110 is typically implemented as a PCI bus (as specified in *PCI Local Bus Specification Rev.* 2.2 available from the PCI Special Interest Group at www.pcisig.com and incorporated by reference herein), or a PCI derivative such as the Advanced Graphics Protocol (AGP) bus defined by Intel Corporation. The depicted embodiment of system 100 includes various peripheral devices including a network adapter 114 suitable for connecting system 100 to computer network and a secondary bridge 120 that provides support for legacy IO devices such as a keyboard 124 and a mouse 126. System 100 further includes a graphics adapter 120 connected to IO bus 110. The graphics adapter 120 is enabled to process graphics data received via IO bus 110 and typically includes a video controller that controls the image displayed on a display device 121.

Figure 1B:
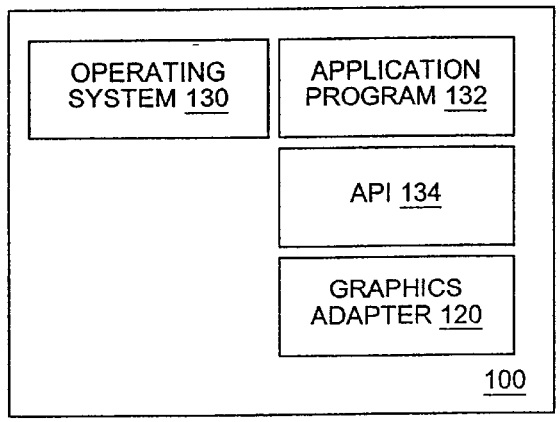

Referring now to FIG. 1B, a conceptual illustration of the system software relevant to the present disclosure is depicted. During system operation, system memory 106 may include all or portions of an operating system 130. Suitable operating systems include the AIX® operating system from IBM Corporation (or another Unix derivative operating system), a Windows® family operating system from Microsoft, or a network operating system such as JavaOS® from Sun Microsystems. An application program 132 generates graphics scenes that are passed to an API 134. In an embodiment particularly relevant to the present disclosure, API 134 may be the OpenGL® API or the graPHIGS API that will be familiar to those in the field of 3D computer graphics. API 134 processes graphics scenes generated by application program 132 and, via graphics adapter 120, maintains the contents of a video display screen, plotter, or other suitable output device.

Figure 2:
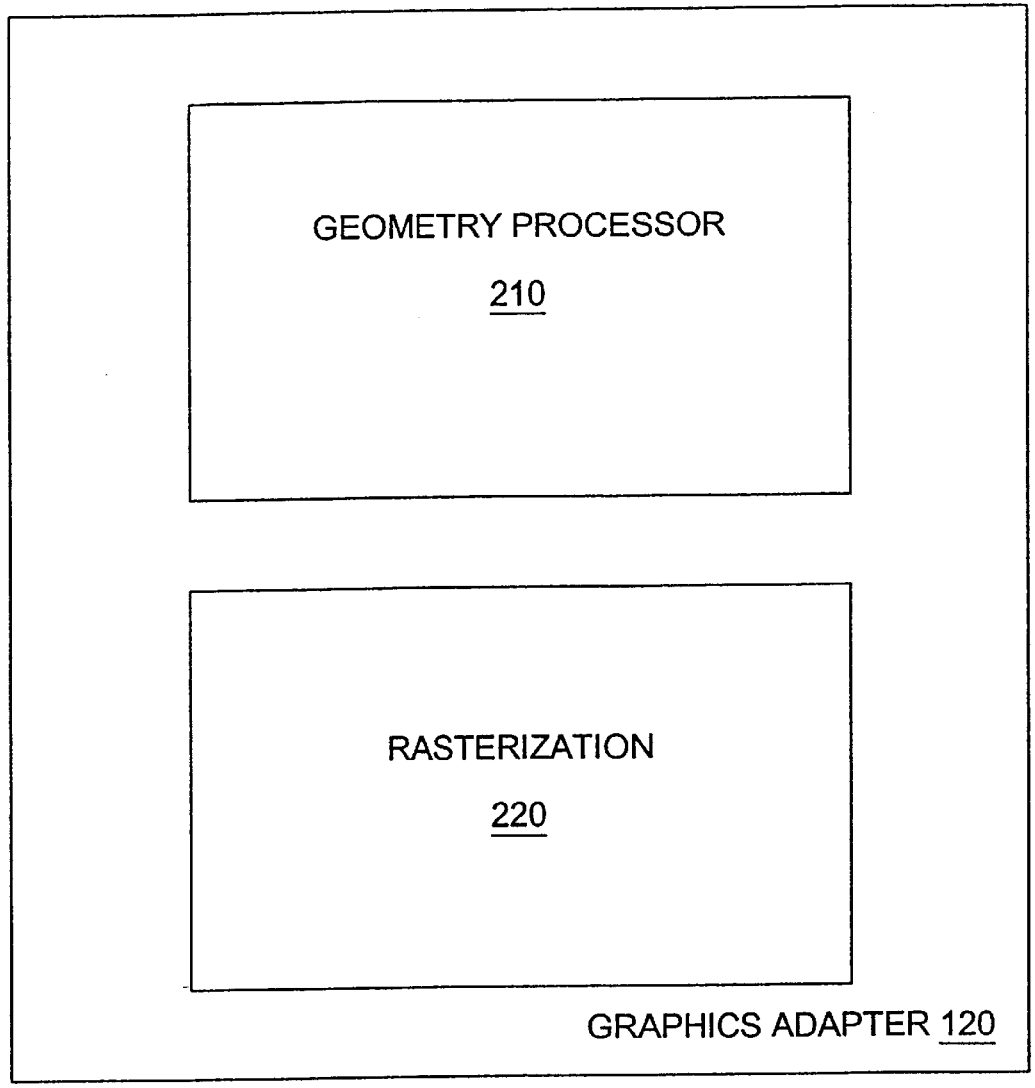
FIG. 2 is a block diagram of an embodiment of the graphics adapter of FIG. 1.

As depicted in FIG. 2, graphics adapter 120 includes a geometry processor 210 and a rasterization portion (rasterizer) 220. The geometry processor 210 performs complex calculations in response to data received from API 134 to generate the attributes specified by API 134. Rasterizer 220 determines pixel values for the display device based upon information received from geometry processor 210 and maintains the contents of a frame buffer 230 or other suitable graphics storage facility. Frame buffer 230 stores a representation of an image that is displayed on the screen of a display device. Frame buffer 230 is typically integrated into graphics adapter 120, but may comprise a separate unit.

Figure 3:
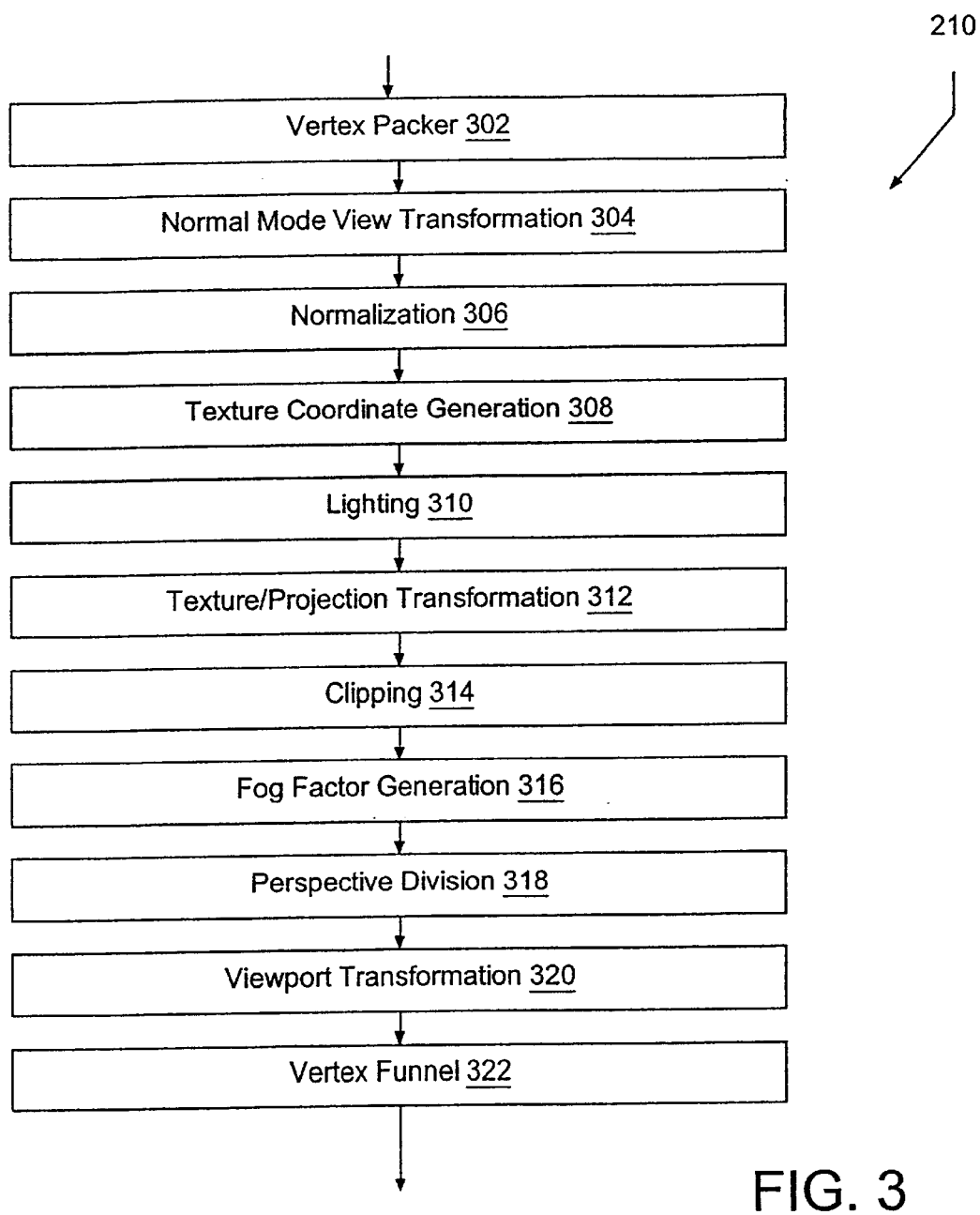
FIG. 3 is a block diagram of an embodiment of a geometry pipeline of the graphics adapter of FIG. 2.

Referring now to FIG. 3, a simplified block diagram of one embodiment of a geometry processor (also referred to as geometry pipeline) 210 is presented. In the depicted embodiment, geometry pipeline 210 may receive data generated by API 134. In one embodiment, geometry processor 210 operates on 64-bit segments of data. Initially, object coordinates are received from API 134 by vertex packer 302, which is responsible for gathering the vertex fragments and storing them in the appropriate field. After the fragments have been stored, the vertex packer sends the entire vertex down geometry pipeline 300.

Vertex packer 302 forwards object coordinates to normal/model view transformation stage 304 where the normal vector is transformed from object space into eye space and the object coordinates are transformed into eye coordinates by translating, scaling, and rotating objects. The normalization stage 306 changes a normal vector to a vector of unit length (i.e., a vector having a magnitude of 1.0), while preserving the direction of the original vector. The texture coordinate generation block 306, as its name implies, is responsible for generating object linear, eye linear, or spherical texture coordinates.

The lighting stage 310 generates the color of each vertex of an object based on the orientation of the object and its material properties as well as the properties of the scene and any light sources that are defined. Texture/projection transformation stage 312 transforms texture coordinates by translating, scaling, and rotating objects and moves objects into a viewing volume by transforming eye coordinates into clip coordinates by translating, rotating, and scaling objects. Perspective projection makes objects that are further away from the viewer appear smaller whereas orthogonal projection does not.

Clipping stage 314 clips objects to a defined viewing volume while fog factor generation stage 316 makes objects fade into the distance by making objects further from the viewer less visible than objects closer to the viewer. The perspective division stage 318 transforms clip coordinates to normalized device coordinates [−1,+1] by dividing by the 4th coordinate (the W coordinate). The view transformation stage 320 facilitates the rasterization process by transforming normalized device coordinates into screen or window coordinates. Finally, the vertex funnel 322 sends the relevant fragments of the vertex to the raster interface sequentially.

The various stages of geometry pipeline 210 calculate values based on equations that are specified by the appropriate graphics API. In lighting stage 310, as an example, these calculations include the computation of terms of the form $B^E$ where the base B and the exponent E are both floating point numbers. Floating point numbers are typically represented in IEEE floating point format. In single precision IEEE floating point, a number is represented in 32 bits (b0–b31), where b0 is a sign bit (S), b1–b8 are exponent bits (EXP), and b9–b31 are mantissa bits (M). A value (V) in the range of $2^{-126}$ to $2^{127}$ is stored in IEEE single precision floating point such that $V=-1^S*2^{(EXP-127)}*1.M$. (In addition, the format identifies special cases for +/−0, +/−infinity, undefined numbers, and denormalized numbers (numbers less than $2^{-126}$)). The present invention provides a floating point circuit (containing some fixed point algorithms) that calculates floating point exponential terms efficiently.

The embodiment of the floating point exponentiation circuit described herein performs the calculation under the following assumptions: (a) the base B is a non-negative number; (b) the exponent E is in the range [0.0 to 128.0]; (c) solutions larger than 4096 can be represented as 4096; (d) solutions less than 1/4096 can be truncated to zero; and (e) the calculated solution need only be accurate to an absolute error of 1/8192 or a relative error of 1/8192. These assumptions are generally valid in the area of computer graphics lighting calculations.

Figure 4:
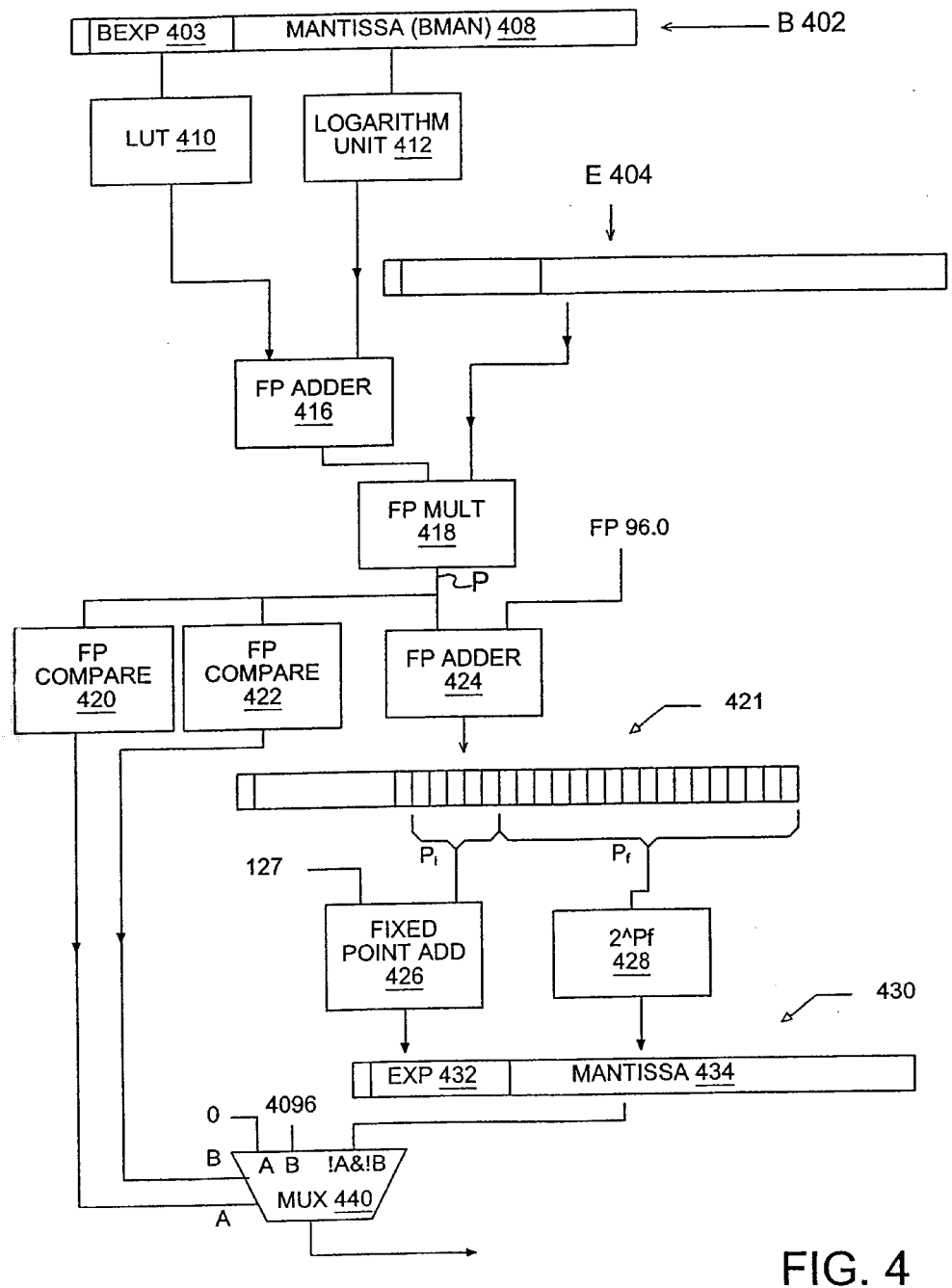
FIG. 4 is a block diagram of a floating point exponentiation circuit according to one embodiment of the invention.

Turning now to FIG. 4, a block diagram of a floating point exponentiation circuit 400 is depicted. Generally speaking, floating point exponentiation circuit 400 computes a result $Y=B^E$ by breaking down the exponentiation into easier to solve components. Initially, the exponential is rearranged as follows:

$Y=B^E$ $=2^{\wedge}(\log_2(B^E))$ $=2^{\wedge}(E*\log_2(B))$ (Eq. 1)

The base B (indicated in FIG. 4 by reference numeral 402) is represented in floating point format by its sign bit (which can be ignored under the assumption that B is non-negative), its 8-bit exponent BEXP 403, and its 23-bit mantissa BMAN 408, where $B=2^{(BEXP-127)}*(1.BMAN)$ and 1.BMAN is a 24-bit value comprised of an implied high order bit of 1 followed by an implied radix point and the 23 bits of BMAN. (Thus, $1 \leq 1.BMAN<2$). Substituting this representation of B into Equation 1 above yields:

$Y=2^{\wedge}(E*\log_2(2^{(BEXP-127)}*(1.BMAN)))$ $=2^{\wedge}(E*(\log_2(2^{(BEXP-127)})+\log_2(1.BMAN)))$ $=2^{\wedge}(E*((BEXP-127)+\log_2(1.BMAN)))$ (Eq. 2)

$=2^{\wedge}P$, where $P=E*((BEXP-127)+\log_2(1.BMAN))$ represents the exponent term of equation 2.

In one embodiment, floating point exponentiation circuit 400 computes P by first generating a floating point value for (BEXP−127) and a floating point approximation of $\log_2(1.BMAN)$. These two floating point values are then added together and multiplied by the exponent E 404 to produce the quantity P.

In one embodiment, the floating point equivalent of BEXP−127 is retrieved from a 256 entry lookup table (LUT) 410 that contains a 32-bit floating point equivalent of the integer BEXP−127 for each of the 256 possible values of BEXP. If, for example, BEXP=132, the entry of LUT 410 corresponding to 132 contains the 32-bit floating point formatted representation of the number 5 (132−127). The floating point value output from table 410 is then added, in floating point adder 416, to the output of a logarithm unit 412.

Figure 5:
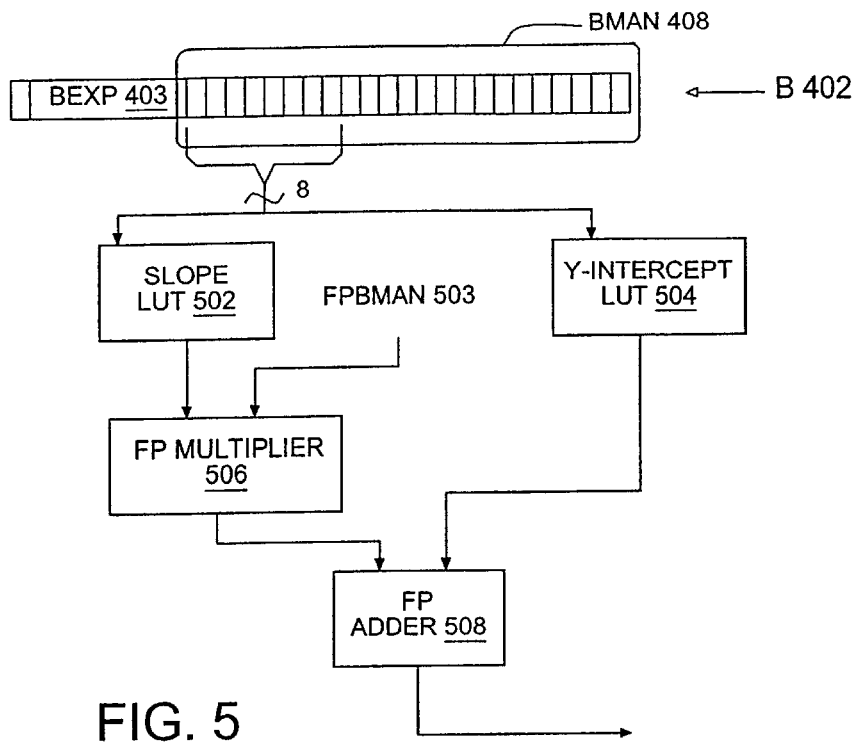
FIG. 5 is a block diagram illustrating greater detail of the logarithm unit of the floating point exponentiation circuit of FIG. 4 according to one embodiment of the invention.

Logarithm unit 412 estimates the logarithm (base 2) of the term 1.BMAN using a linear approximation technique. Referring to FIG. 5, the depicted embodiment of logarithm unit 412 uses a portion of BMAN 408 to retrieve slope and y-intercept values that define a linear approximation to the curve $y=\log_2(x)$ at a point x indicated by the portion of BMAN and then using the full BMAN to determine a point on the linear approximation where the point represents the approximation of 1.BMAN. More specifically, the depicted embodiment of logarithm unit 412 includes a slope LUT 502 and a y-intercept LUT 504. Slope LUT 502 and y-intercept LUT 504 are both 256×32-bit tables in which each entry is formatted in 32-bit floating point format. The high order 8-bits of BMAN 408 form an index to each of the tables and retrieve a slope value and a y-intercept value for a line that approximates the logarithm curve at the point x=1.BMAN. The approximation of the $\log_2(1.BMAN)$ is then calculated from the linear equation y=mx+b where the slope m is the value retrieved from slope LUT 502, the y-intercept b is the value retrieved from y-intercept LUT 504 and x is the floating point representation of 1.BMAN. Accordingly, the value retrieved from slope LUT 502 is multiplied in a floating point multiplier 506 by a floating point representation of 1.BMAN and the output of floating point multiplier 506 is added to the output of y-intercept LUT 504 in floating point adder 508. The floating point representation of 1.BMAN is produced efficiently by loading BMAN 408 into the tower order 23 bits of a floating point register in which the upper 9 bits have been set to 0 0111 1111 (representing a sign bit of 0 and an exponent field of 127).

Figure 7:
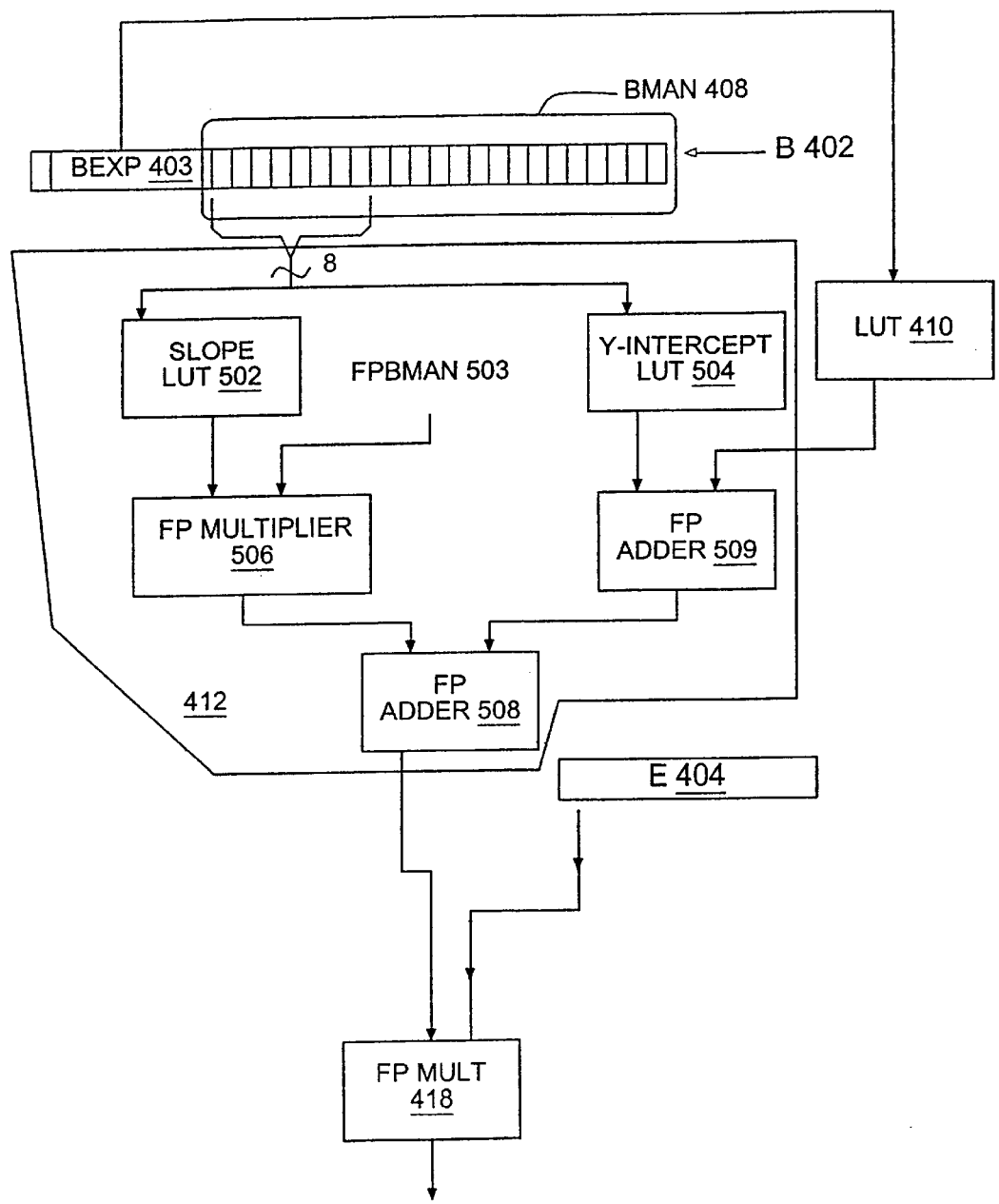
FIG. 7 is a block diagram illustrating an alternative configuration of the logarithm unit.

The output of floating point adder 416 represents the value (BEXP−127)+$\log_2$(1.BMAN). This value is then multiplied by exponent E 404 in floating point multiplier 418 to obtain the value P. (Recall that $B^E=2^P$). Turning briefly to FIG. 7, an alternative layout of portions of FLOATING POINT EXPONENTIATION circuit 400 is depicted. In the embodiment depicted in FIG. 7, the floating point adder 416 is eliminated and another floating point adder 509 is included in logarithm unit 412 to improve performance by adding the output of LUT 410 to the output of LUT 504 while floating point multiplier 506 is multiplying the output of LUT 502 by the floating point representation 503 of BMAN. Although this embodiment achieves the same functional result as FIG. 4, in which the output of LUT 410 is added to the output of logarithm unit 412, the embodiment depicted in FIG. 7 achieves superior performance by performing a pair of floating point operations in parallel.

In one embodiment, floating point exponentiation circuit 400 includes upper and lower limit values against which the value P is compared. If P is outside of a defined range, a limit value for $B^E$ is substituted for the actual value. The depicted embodiment of floating point exponentiation circuit 400 includes a first floating point comparator 420 that compares P with an upper limit of +12 (corresponding to an upper limit of 4096) and a second comparator 422 that compares P with a lower limit of −12 (corresponding to a lower limit of 1/4096). The outputs of comparators 420 and 422 provide select inputs to a multiplexer 440. If the first comparator 420 indicates that P is greater than 12, the multiplexer selects the upper limit of 4096 ($2^{12}$) as the final result. If the second comparator 422 indicates that P is less than −12, the multiplexer selects a lower limit of 0 as the final output. If P is greater than −12 and less than 12 additional processing is performed to generate a result value.

In the depicted embodiment, the value P is adjusted to facilitate the calculation of $2^P$ when P is within the specified range. More specifically, P is adjusted by adding a floating point constant to P. The floating point constant, when added to P, results in a sum that is within a range encompassed by a single IEEE floating point exponent. By forcing the sum of P and the floating point constant into a single exponent range, the exponent field of the resulting sum can be ignored, and an integer plus fraction representation of P can be read out of the mantissa.

In the depicted embodiment, the interesting values of P are in the range from −12 to 12 (values outside this range are "uninteresting" because they produce a limit value result). To force the sum of the floating point constant and P into a range encompassed by a single floating point format exponent, the depicted embodiment of the invention adds a floating point constant of 96 to P in floating point adder 424. Adding 96 to P forces the resulting sum (referred to as the adjusted value P) into a range from 84 to 108, which lies entirely within the range of IEEE floating point formatted values that have an exponent field of 0x85 (133). Floating point formatted values with this exponent field range in value from 64 to 128. Note that the mantissa of the floating point constant 96 is equal to 0x400000. In other words, the mantissa of the floating point constant 96 consists of a 1 in the highest order bit followed by 22 bits of zero. When this value is added to a floating point number P in the range of −12 to 12, the value P can be extracted directly from the mantissa of the floating point representation of the resulting sum 421. More specifically, the lower 22 bits of the mantissa of the adjusted value P indicate the value of P (in 2's complement format) in the form of a fixed point decimal where 5 bits represent the integer portion of P and 17 bits representing the fractional portion of the P.

If for example, P=10.5, the adjusted value P generated by adding 96.0 to P is equal to 106.5. The IEEE floating point format exponent field for 106.5 is 133 (corresponding to $2^{(133-127)}$ or $2^6$) and the 23-bit mantissa is 10101010000000000000000b (corresponding to 85/128). Recall that the value of a floating point number with exponent field EXP and mantissa field MAN=$2^{(EXP-127)}$ *1.MAN. Plugging the exemplary values into this formula produces $2^6$*(185/128)=106.5. Notice, however, that the original value 10.5 is represented in the lower 22-bits of the MAN itself. More specifically, the upper most five bits of the lower 22 bits of MAN (referred to herein as $P_i$) are equal to the integer portion of P (i.e., 10) while the lower 17 bits of MAN (referred to herein as $P_f$) are equal to the fractional portion of P (i.e., 0.5). Thus, the floating point representation of the adjusted value of P has a mantissa field that includes a first fixed point portion $P_i$ representing the integer portion of P and a second fixed point portion $P_f$ representing the fractional portion of P. Using, as a second example, a negative value of P such as P=−3.625 results in an adjusted value of P=P+96.0=92.375. The floating point exponent of 92.375 is 133 (as is the floating point exponent of all values resulting from the sum of P and 96.0 when P is in the range of −12 to 12) and the mantissa is 01110001100000000000000 (corresponding to a value of 227/512). Discarding the most significant mantissa bit leaves a 22-bit value of 1110001100000000000000. Since the upper most bit is 1, the corresponding value is negative. Taking the 2's complement leaves 0001110100000000000000. The upper 5 bits indicate a value of $P_i$ equal to 3 while the lower 17 bits indicate a value of $P_f$ equal to 5/8. Thus the value P=−3.625 is indicated in the lower 22 bits of the mantissa of the floating point representation of the value P+96.0.

Returning now to FIG. 4, the output of floating point adder 420 is a floating point value 412 the represents the sum of P+96.0. From this value, the integer portion Pi and fractional portion Pf of P may be extracted. Since the goal is to determine $2^P$ and P=$P_i$+$P_f$, the goal is achieved by determining $2^{(P_i+P_f)}=2^{P_i}*2^{P_f}$. In other words:

$$B^E = 2^{P_i} * 2^{P_f} \qquad \text{(Eq. 3)}$$

Since $P_f$ is a value in the range of 0 to 1, $2^{P_f}$ ranges in value from 1 to 2. Thus, Equation 3 is of the same form as the IEEE floating point format where $P_i$ corresponds to the IEEE exponent field (EXP−127) and $2^{P_f}$ corresponds to the 24-bit IEEE field 1.MANTISSA.

Floating point exponentiation circuit 400 takes advantage of the parallels between the IEEE floating point format and Equation 3 to efficiently determine an approximation of the value $B^E$. More specifically, the fixed point value $P_i$ is extracted from register 421 and added to a fixed point value of 127 in fixed point adder 426 to produce the exponent for the floating point representation of $2^P$ or $B^E$. Thus, the output of fixed point adder 426 is loaded directly into the exponent field 432 of a floating point result register 430. The mantissa of result register 430 is determined from the $P_f$ portion of register 421 in an exponential unit 428.

Figure 6:
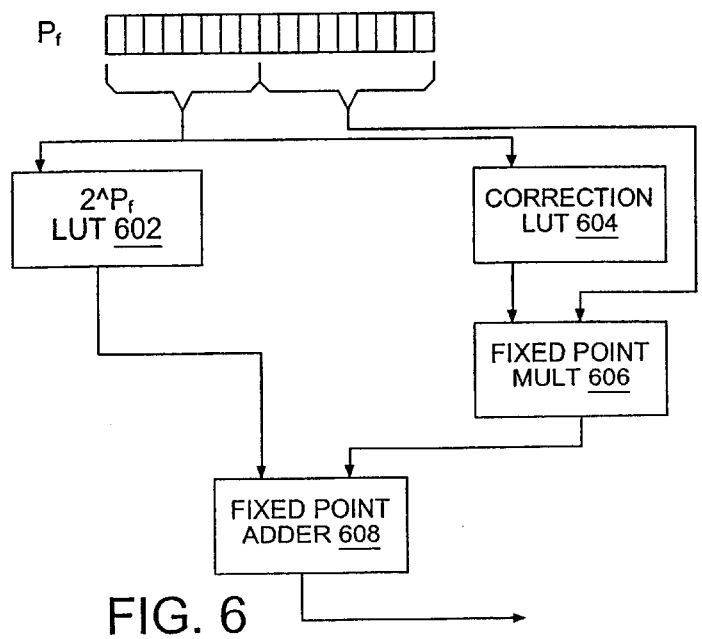
FIG. 6 is a block diagram illustrating greater detail of the exponential unit of the floating point exponentiation circuit of FIG. 4 according to one embodiment of the invention.

Referring to FIG. 6, exponential unit 428 uses a pair of lookup tables to obtain an estimate of $2^{P_f}$ and a correction factor. In the depicted embodiment, the estimate of $2^{P_f}$ is retrieved from a $2^{P_f}$ LUT 602 and a correction factor is retrieved from correction factor LUT 604. A portion of $P_f$ is used to index LUT's 602 and 604. In the depicted embodiment, the upper 8 bits of $P_f$ are used to index the LUT's. The output of LUT 602 is a fixed point representation of $2^X$ where X is specified by the upper 8-bits of $P_f$. The output of LUT 604 (the correction factor) represents the slope of the function Y=$2^X$ at the point X specified by the upper bits of $P_f$. The correction factor is multiplied by the lower portion of $P_f$ (the lower nine bits of $P_f$ in the depicted embodiment) in fixed point multiplier 606 and this product is then added to the original estimate produced by LUT 602 in fixed point adder 608.

Returning to FIG. 4, the output of fixed point adder 608 of FIG. 6 represents the output of exponential unit 428. This value is loaded directly into the mantissa field 434 of floating point register 430. With the output of adder 426 stored in the exponent field 432 and the output of exponential unit 428 stored in the mantissa field 428, the result register 430 contains the approximation of $B^E$.

It will be apparent to those skilled in the art having the benefit of this disclosure that the present invention contemplates a hardware implemented clipping stage in the geometry pipeline of a graphics adapter. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A floating point exponentiation circuit suitable for calculating the value B^E where B and E are floating point values, comprising:

circuitry for producing a value P, where P is approximately equal to $E*((BEXP-127)+\log_2(1.BMAN))$, wherein BEXP is an exponent field of the base B and 1.BMAN includes the mantissa field of the base B, a high order bit of "1", and a radix point between the high order "1" bit and the mantissa field;

circuitry for adjusting the value P, wherein the floating point representation of the adjusted value of P includes a mantissa field that includes a fixed point portion $P_i$ representing the integer portion of P and a fixed point portion $P_f$ representing the fractional portion of P;

circuitry for producing from $P_i$ a result exponent field suitable for storage in an exponent field of a floating point result register; and circuitry for producing from $P_f$ a result mantissa field suitable for storage in a mantissa field of a floating point result register.

2. The circuit of claim 1, wherein the circuitry for producing P includes:

a first lookup table configured to retrieve a floating point representation of (BEXP-127); and a logarithm unit configured to generate an estimate of the $\log_2(1.BMAN)$.

3. The circuit of claim 2, wherein the logarithm unit includes a slope LUT and a Y intercept LUT that together define a linear approximation to the curve $y=\log_2(x)$ at a point x defined by a portion of BMAN.

4. The circuit of claim 3, wherein the logarithm unit includes a floating point multiplier that multiplies the output of the slope LUT by a floating point representation of BMAN.

5. The circuit of claim 4, wherein the logarithm unit further includes a first floating point adder that adds the output of the Y-intercept LUT and the output of the first lookup table.

6. The circuit of claim 5, wherein the logarithm unit further includes a second floating point adder that adds the output of the floating point multiplier and the output of the first floating point adder.

7. The circuit of claim 4, wherein the logarithm unit includes a first floating point adder that adds the output of the floating point multiplier and the output of the y-intercept LUT, and wherein the floating point exponentiation circuit includes a second floating point adder that adds the output of the first floating point adder and the output of the first lookup table.

8. The circuit of claim 1, further comprising floating point comparator circuitry configured to compare the value P against upper and lower limits.

9. The circuit of claim 8, further configured to produce an upper limit value if the value P exceeds the upper limit and a lower limit value if the value P exceeds the lower limit value.

10. The circuit of claim 9, wherein a floating point representation of the adjusted value of P has a common exponent field regardless of the value of P if P is greater than the lower limit and less than the upper limit.

11. The circuit of claim 1, wherein circuitry for adjusting the value P comprises a floating point adder configured to add a floating point constant to the value P.

12. The circuit of claim 1, wherein the circuitry for producing the result exponent field includes an adder configured to add a value of 127 to $P_i$, wherein the output of the adder is suitable for storing in an exponent field of a floating point result register.

13. The circuit of claim 1, wherein the circuitry for producing the result mantissa field includes an exponential LUT and a correction LUT, wherein a first portion of $P_f$ is used to index the exponential and correction LUT's to retrieve an estimate of $2^{P_f}$ and a correction factor respectively.

14. The circuit of claim 13, further comprising a multiplier configured to multiply a second portion of $P_f$ by the correction factor and still further comprising an adder configured to add the estimate of $2^{P_f}$ and the output of the adder, wherein the output of the multiplier is suitable for storing in a mantissa field of the result register.

15. A graphics adapter suitable for use in a data processing system, the graphics adapter including geometry processor and a rasterization unit, the geometry processing including a floating point exponentiation circuit suitable for calculating the value B^E where B and E are floating point values, comprising:

circuitry for producing a value P, where P is approximately equal to $E*((BEXP-127)+\log_2(1.BMAN))$, wherein BEXP is an exponent field of the base B and 1.BMAN is a 24-bit mantissa field of the base B;

circuitry for adjusting the value P, wherein the floating point representation of the adjusted value of P includes a mantissa field that includes a fixed point portion $P_i$ representing the integer portion of P and a fixed point portion $P_f$ representing the fractional portion of P;

circuitry for producing from $P_i$ a result exponent field suitable for storage in an exponent field of a floating point result register; and circuitry for producing from $P_f$ a result mantissa field suitable for storage in a mantissa field of a floating point result register.

16. The graphics adapter of claim 15, wherein the circuitry for producing P includes:

a first lookup table configured to retrieve a floating point representation of (BEXP-127); and a logarithm unit configured to generate an estimate of the $\log_2(1.BMAN)$.

17. The graphics adapter of claim 15, further comprising floating point comparator circuitry configured to compare the value P against upper and lower limits and wherein the floating point exponentiation circuit is configured to produce an upper limit value if the value P exceeds the upper limit and a lower limit value if the value P exceeds the lower limit value.

18. The graphics adapter of claim 15, wherein circuitry for adjusting the value P comprises a floating point adder configured to add a floating point constant to the value P.

19. The graphics adapter of claim 15, wherein the circuitry for producing the result exponent field includes an adder configured to add a value of 127 to $P_i$, wherein the output of the adder is suitable for storing in an exponent field of a floating point result register.

20. The graphics adapter of claim 15, wherein the circuitry for producing the result mantissa field includes an exponential LUT and a correction LUT, wherein a first portion of $P_f$ is used to index the exponential and correction LUT's to retrieve an estimate of $2^{\wedge}P_f$ and a correction factor respectively.

21. A data processing system including processor, memory, input device, and display, the data processing system including graphics adapter comprising a geometry processor and a rasterization unit, the geometry processing including a floating point exponentiation circuit suitable for calculating the value $B^{\wedge}E$ where B and E are floating point values, comprising:

circuitry for producing a value P, where P is approximately equal to $E*((BEXP-127)+\log_2(1.BMAN))$, wherein BEXP is an exponent field of the base B and 1.BMAN is a 24-bit mantissa field of the base B;

circuitry for adjusting the value P, wherein the floating point representation of the adjusted value of P includes a mantissa field that includes a fixed point portion $P_i$ representing the integer portion of P and a fixed point portion $P_f$ representing the fractional portion of P;

circuitry for producing from $P_i$ a result exponent field suitable for storage in an exponent field of a floating point result register; and circuitry for producing from $P_f$ a result mantissa field suitable for storage in a mantissa field of a floating point result register.

22. The data processing system of claim 21, wherein the circuitry for producing P includes:

a first lookup table configured to retrieve a floating point representation of (BEXP−127); and a logarithm unit configured to generate an estimate of the $\log_2(1.BMAN)$.

23. The data processing system of claim 21, further comprising floating point comparator circuitry configured to compare the value P again upper and lower limits and wherein the floating point exponentiation circuit is configured to produce an upper limit value if the value P exceeds the upper limit and a lower limit value if the value P exceeds the lower limit value.

24. The data processing system of claim 21, wherein circuitry for adjusting the value P comprises a floating point adder configured to add a floating point constant to the value P.

25. The data processing system of claim 21, wherein the circuitry for producing the result exponent field includes an adder configured to add a value of 127 to $P_i$, wherein the output of the adder is suitable for storing in an exponent field of a floating point result register.

26. The data processing system of claim 21, wherein the circuitry for producing the result mantissa field includes an exponential LUT and a correction LUT, wherein a first portion of $P_f$ is used to index the exponential and correction LUT's to retrieve an estimate of $2^{\wedge}P_f$ and a correction factor respectively.

* * * * *

UNITED STATES PATENT AND TRADEMARK OFFICE
CERTIFICATE OF CORRECTION

PATENT NO. : US 6,681,237 B1
DATED : January 20, 2004
INVENTOR(S) : Gordon Clyde Fossum and Thomas Winters Fox It is certified that error appears in the above-identified patent and that said Letters Patent is hereby corrected as shown below:

<u>Column 12,</u>
Line 10, "again" should read -- against --.

Signed and Sealed this

Third Day of August, 2004

JON W. DUDAS
*Acting Director of the United States Patent and Trademark Office*